United States Patent [19]

Hirose et al.

[11] Patent Number: 5,460,519
[45] Date of Patent: * Oct. 24, 1995

[54] METHOD AND APPARATUS FOR HEAT RECOVERY

[75] Inventors: Yasuo Hirose; Hitoshi Kaji, both of Yokohama, Japan

[73] Assignees: Furncie Techno Co. Ltd.; Chiyoda Corporation, both of Japan

[*] Notice: The portion of the term of this patent subsequent to Jan. 4, 2011 has been disclaimed.

[21] Appl. No.: 172,832

[22] Filed: Dec. 23, 1993

Related U.S. Application Data

[63] Continuation-in-part of Ser. No. 911,908, Jul. 10, 1992, Pat. No. 5,275,556.

[30] Foreign Application Priority Data

Jul. 29, 1991 [JP] Japan ..................................... 3-59434
Apr. 21, 1992 [JP] Japan ..................................... 4-101191

[51] Int. Cl.$^6$ .............................. F02D 17/00; F24C 3/00
[52] U.S. Cl. ......................................... 432/181; 126/91 A
[58] Field of Search ..................................... 432/179, 180, 432/181; 126/91 A

[56] References Cited

U.S. PATENT DOCUMENTS

| | | | |
|---|---|---|---|
| 4,604,051 | 8/1986 | Davies et al. | 126/91 A |
| 4,856,492 | 8/1989 | Kawamoto | 126/91 A |
| 4,870,947 | 10/1989 | Kawamoto | 432/181 |
| 4,878,480 | 11/1989 | Watson et al. | 126/91 A |
| 5,059,117 | 10/1991 | Wills | 126/91 A |

FOREIGN PATENT DOCUMENTS 55-110817  8/1980  Japan.

Primary Examiner—Henry C. Yuen
Assistant Examiner—Weilun Lo
Attorney, Agent, or Firm—Connolly & Hutz

[57] ABSTRACT

This invention discloses a method and apparatus for heat recovery so constructed that in the process of supplying an oxidizing agent through an oxidizing agent supply path into the main body of a combustion apparatus and discharging a hot exhaust gas of combustion from the interior of the main body of the combustion apparatus, the oxidizing agent and the exhaust gas are caused to flow through a gas-pervious regenerating member formed in a lateral wall of the main body of the combustion apparatus and the area for passing the oxidizing agent in the regenerating part heated by the exhaust gas is changed along the course of time. Since the regenerating member is stationary and the oxidizing agent supply path is movable, the regenerating member itself admits of dimensional increase and the combustion apparatus enjoys a high capacity for combustion, permits a reduction in the interval between the time the combustion is started and the time the temperature of combustion reaches a prescribed level, and enables the combustion to proceed in a range of high temperature. The apparatus, therefore, is simple in structure and brings about generous energy saving, ensures high operational safety, and features a long service life.

37 Claims, 8 Drawing Sheets

RELATION BETWEEN REVOLUTION NUMBER AND TEMPERATURE

METHOD AND APPARATUS FOR HEAT RECOVERY

This application is a continuation-in-part of application Ser. No. 911,908 filed Jul. 10, 1992, which is now U.S. Pat. No. 5,275,556.

BACKGROUND OF THE INVENTION

1. Field of the Invention

This invention relates to a method and apparatus which is so constructed as to utilize the heat of an exhaust gas discharged from a site of combustion for the purpose of heating such an oxidizing agent as air which is intended for the combustion.

2. Description of the Prior Art

In the combustion apparatuses which are used in such industrial furnaces as forging furnaces, normalizing furnaces, and pipestill heaters and boilers, the heat recovery type combustion apparatuses which are so configured as to utilize the heat of an exhaust gas discharged from a site of combustion for the purpose of heating such an oxidizing agent as air which is intended for the combustion have been finding general acceptance.

The words "oxidizing agent" as used herein constitute themselves the generic term for designating such gases as pure oxygen, air and oxygen-enriched air which contain oxygen gas or oxygen molecules. In some case, such oxidizing elements as halogen and such oxidizing compound as nitrogen oxide may be used as the oxidizing agent.

The recuperator which is used in these combustion apparatuses is generally provided with a specific heat exchanger interposed between an exhaust gas line and a combustion air line which are closely disposed to each other and, therefore, is enabled to exchange heat between the oxidizing agent and the exhaust gas flowing through the two lines and utilize the heat of the exhaust gas resulting from combustion for heating the oxidizing agent to be used for the combustion. The heat which is recovered by means of this recuperator is about 50% in point of temperature level. In the case of an industrial furnace which gives rise to exhaust gas of a temperature of 1,200° C., for example, the oxidizing agent which has exchanged heat with the exhaust gas has a temperature of about 600° C.

The recuperator is heavily restricted in point of not only material for the construction thereof but also space for the installation thereof. It possibly occupies more floor space than the main body of a furnace or a heating apparatus.

Recently, the present inventor has proposed a combustion apparatus (Japanese Unexamined Patent Publication No. 222,102/1989) which is configured as illustrated in FIGS. 9 and 10.

This heat recovery apparatus 100 is provided with a burner 112 for heating a substance W subjected to the heating inside the main body R of a furnace. In the wall of the furnace near the burner 112 is disposed a regenerative member 122 made of an air-pervious ceramic material, with a cylindrical shape and to be partitioned to the pattern of a honeycomb. This regenerative member 122 absorbs the heat of the hot exhaust gas when this exhaust gas is discharged from within the main body R and allows this heat for heating the oxidizing agent which is passing through an air path 119. The supply of the heat to the oxidizing agent is continued by causing the regenerative member 122 by a motor M through a rotary shaft 123.

However, since this heat recovery apparatus 100 must rotate the regenerative member 122 exposed to the interior of the main body R which is destined to rise to a high temperature, it is required either to interpose between the rotary shaft 123 and the motor M heat-insulating means capable of intercepting the heat transmitted from the regenerative member 122 via the rotary shaft 123 to the motor M or to set the motor M at a position so distant as to disrupt the thermal effect of the regenerative member 122. The provision of these means adds to the size of the heat recovery apparatus 100 or complicates the whole configuration thereof.

Further, the regenerative member 122 of this heat recovery apparatus 100 remains at an elevated temperature while in service and at a low temperature while out of service and alternates expansion and shrinkage in spite of the ceramic material thereof. When the regenerative member made of the ceramic material which alternates expansion and shrinkage as described above must be rotated, it is allowed a desired increase in size only with difficulty. A combustion apparatus with a large capacity for combustion which consumes the oxidizing agent and discharges the exhaust gas both in huge volumes, therefore, is not easily attained.

Further, the regenerative apparatus which alternates expansion and shrinkage and, at the same time, rotates renders it difficult to set the burner in place at the center thereof. It, therefore, has the disadvantage in that the burner and the oxidizing agent path are separated from each other, the flexibility with which the size, sharpness, etc. of a flame emitted from the burner are controlled is degraded, and the capacity for control or versatility dwindles. Though various electrical control devices may be used for the purpose of improving the controllability of the burner, for example, the use of these devices is not desirable because they increase the cost of the apparatus as a whole.

SUMMARY OF THE INVENTION

This invention has been PRODUCED for the solution of the problems which are entailed by the prior techniques as described above. The first object of this invention is to provide a method for heat recovery which permits efficient recovery of heat from an exhaust gas.

The second object of this invention is to provide a regenerative type heat recovery apparatus which is capable of enhancing the heat intensity of flame and the flame temperature, simple in construction, rich in flexibility of the formation of flame, able to allow addition to size, effective in saving energy and ensuring safety of operation, and long in service life.

The third object of this invention is to provide a method for combustion which permits efficient recovery of heat from an exhaust gas.

The fourth object of this invention is to provide a regenerative combustion apparatus which allows the flame temperature to be heightened owing to high heat intensity of flame, owns simplicity of construction, confers flexibility on the formation of a flame, admits of a dimensional increase, brings about effective consumption of energy, abounds in safety of operation, and offers a long service life.

The fifth object of this invention is to provide an ash-dissolving furnace which heightens the temperature of an oxidizing agent to a level beyond the upper limit attainable by the conventional heat exchanger to heighten the temperature of combustion enough to dissolve ash and, at the same time, coat the inner wall of the furnace with the dissolved ash, and attain prevention of the furnace from loss by fusion.

To accomplish the first object, this invention is directed to a method for regenerative heat recovery by the steps of causing the oxidizing agent discharged from an oxidizing agent supply path forwarding the oxidizing agent through the interior thereof to be passed through an air-permeable regenerating part fixed in a wall of the main body of the combustion apparatus and supplied into the main body of the combustion apparatus and, at the same time, causing a high-temperature exhaust gas resulting from the combustion proceeding in the main body of the combustion apparatus to be passed through the regenerating part and discharged to the exterior of the main body of the combustion apparatus via an exhaust gas discharging path thereby heating the oxidizing agent with the heat of the exhaust gas through the regenerating part, which method is characterized by allowing the oxidizing agent discharged through the oxidizing agent supply path to pass through part of the regenerating part and, at the same time, causing the area of the regenerating part for passage of the oxidizing agent to be changed along the course of time.

To accomplish the second object, this invention is directed to an apparatus for regenerative heat recovery comprising a burner for heating a substance for combustion in the main body of a combustion apparatus, an oxidizing agent supply path for supplying an oxidizing agent to the burner, an exhaust gas discharge path for discharging the exhaust gas resulting from the combustion to the exterior of the main body of the combustion apparatus, and a regenerating part for heating the oxidizing agent with the sensible heat of the exhaust gas, which apparatus for heat recovery is characterized by having the regenerating part formed of a air-pervious regenerating member, attaching the regenerating member to a wall of the main body of the combustion apparatus, and causing the oxidizing agent discharged through the oxidizing agent supply path to pass through part of the regenerating member and, at the same time, causing the area of the regenerating member for passing the oxidizing agent to be changed along the course of time.

To accomplish the third object, this invention is directed to a method for combustion by the steps of causing an oxidizing agent discharged from an oxidizing agent supply path forwarding the oxidizing agent through the interior thereof to be passed through an air-permeable regenerating part fixed in a wall of the main body of the combustion apparatus and supplied into the main body of the combustion apparatus and, at the same time, causing a high-temperature exhaust gas resulting from the combustion proceeding in the main body of the combustion apparatus to be passed through the regenerating part and discharged to the exterior of the main body of the combustion apparatus via an exhaust gas discharging path thereby heating the oxidizing agent with the heat of the exhaust gas through the regenerating part, which method is characterized by allowing the oxidizing agent discharged through the oxidizing agent supply path to pass through part of the regenerating part and, at the same time, causing the area of the regenerating part for passage of the oxidizing agent to be changed along the course of time.

To accomplish the fourth object, this invention is directed to a method for combustion comprising the steps of causing an oxidizing agent discharged from an oxidizing agent supply path forwarding the oxidizing agent through the interior thereof to be passed through an air-permeable regenerating part fixed in a wall of the main body of the combustion apparatus and supplied into the main body of the combustion apparatus and, at the same time, causing a high-temperature exhaust gas resulting from the combustion proceeding in the main body of the combustion apparatus to be passed through the regenerating part and discharged to the exterior of the main body of the combustion apparatus via an exhaust gas discharging path thereby heating the oxidizing agent with the heat of the exhaust gas through the regenerating part, which apparatus is characterized by allowing the oxidizing agent discharged through the oxidizing agent supply path to pass through part of the regenerating part and, at the same time, causing the area of the regenerating part for passage of the oxidizing agent to be changed along the course of time.

To accomplish the fifth object, this invention is directed to an ash-dissolving furnace having attached to the body of the furnace an apparatus for combustion comprising a burner for heating a substance for heating in the body of the furnace, an oxidizing agent supply path for supplying an oxidizing agent to the burner, an exhaust gas discharge path for discharging an exhaust gas resulting from the combustion to the exterior of the body of the furnace, and a regenerating part for heating the oxidizing agent with the sensible heat of the exhaust gas, which ash-melting furnace is characterized by having the regenerating part formed of a regenerating member, attaching the regenerating member to a wall of the main body of the combustion apparatus, and causing the oxidizing agent discharged through the oxidizing agent supply path to pass through part of the regenerating member and, at the same time, causing the area of the regenerating member for passing the oxidizing agent to be changed along the course of time.

DETAILED DESCRIPTION OF THE PREFERRED EMBODIMENT

Now, this invention will be described below with reference to the drawings illustrating embodiments of this invention.

Figure 1:
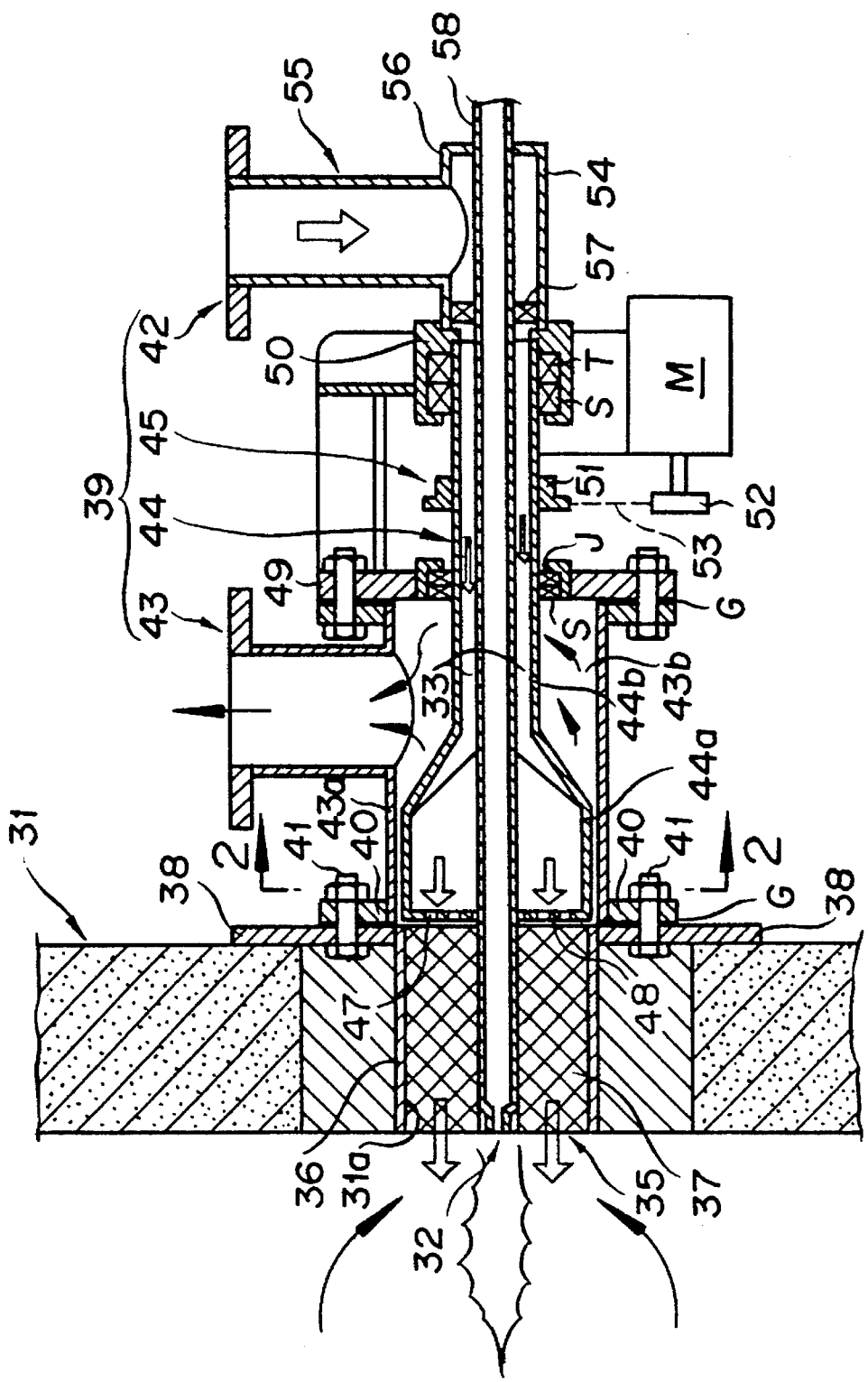
FIG. 1 is a schematic cross section of an apparatus for regenerative heat recovery as one embodiment of this invention.

In FIG. 1, a generative heat recovery apparatus 30 is, for instance, attached to the lower part of the main body 31 of the combustion apparatus formed of a forging furnace and is used as a heat source for heating a substance such as ingot placed inside the main body 31 and subjected to heating and, at the same time, used as a heat recovery apparatus for adding the heat of the exhaust gas discharged from the main body 31 of the combustion apparatus to the oxidizing agent thereby effecting recovery of the heat of the exhaust gas.

The generative heat recovery apparatus 30 is provided with a burner 32 for radiating flame in the direction of the substance placed inside the main body 31 and subjected to combustion, an oxidizing agent supply path 33 disposed in the proximity of the burner 32 and adapted to allow flow of the oxidizing agent in the interior thereof, an exhaust gas path 34 (FIG. 2) disposed in the proximity of the oxidizing agent supply path 33 and adapted to discharge exhaust gas arising from combustion out of the interior of the main body 31, and a heat-exchange member 35 capable of transmitting the heat of the exhaust gas to the oxidizing agent flowing through the oxidizing agent supply path 33.

The main body 31 of combustion apparatus is made of a refractory material such as fire bricks. It has an opening 31a formed in the lateral wall thereof. The heat-exchange member 35 mentioned above is set in place inside this opening 31a. This heat-exchange member 35 is formed of an air-pervious regenerative member 37 made of a heat resisting substance and shaped after a honeycomb. The regenerative member 37 is supported by a mortar 36 interposed between itself and the opening 31a. A heat resisting material may be suitably selected in dependence on conditions for use. Ceramic material such as oxide, nitride and carbide, heat and acid resisting metallic material such as stainless steel and hastelloy, and a composite material composed of ceramic material and metallic material or ceramic material and high-melting material may be used. Aluminum oxide, silica, quartz, zirconia, silicon carbide, silicon nitride and SIALON may be used as a ceramic material. In this invention cordierite, mullite and zirconmulite are desirable in particular by reason of advantages such as high-temperature strength, facility of processing and heat capacity. At the center of the regenerative member 37 is disposed the burner 32 the leading terminal of which is exposed inside the main body 31 of combustion apparatus. This burner 32 is an ordinary gas or oil burner. The oxidizing agent from the oxidizing agent supply path 33 is spouted through the regenerative member 37 which encircles the burner 32. Since the oxidizing agent is spouted through the periphery of the burner 32, there is derived a secondary effect of precluding the upward displacement of the flame of the burner 32 by the oxidizing agent itself.

A plate 38 for supporting the burner 32 is formed along the outer edge of the opening 31a. To this plate 38, a flange 40 of a main body case 39 is connected with bolts 41 through a gasket G so as to establish communication between the main body case 39 and the regenerative member 37.

The main body case 39 is provided with an oxidizing agent inlet part 42 for introducing an oxidizing agent by means of a blower, for example, an outlet part 43 for discharging exhaust gas from the interior of the case, a rotary duct 44 interposed between the oxidizing agent inlet part 42 and the regenerative member 37, and a driving means 45 for rotating the rotary duct 44.

Figure 2:
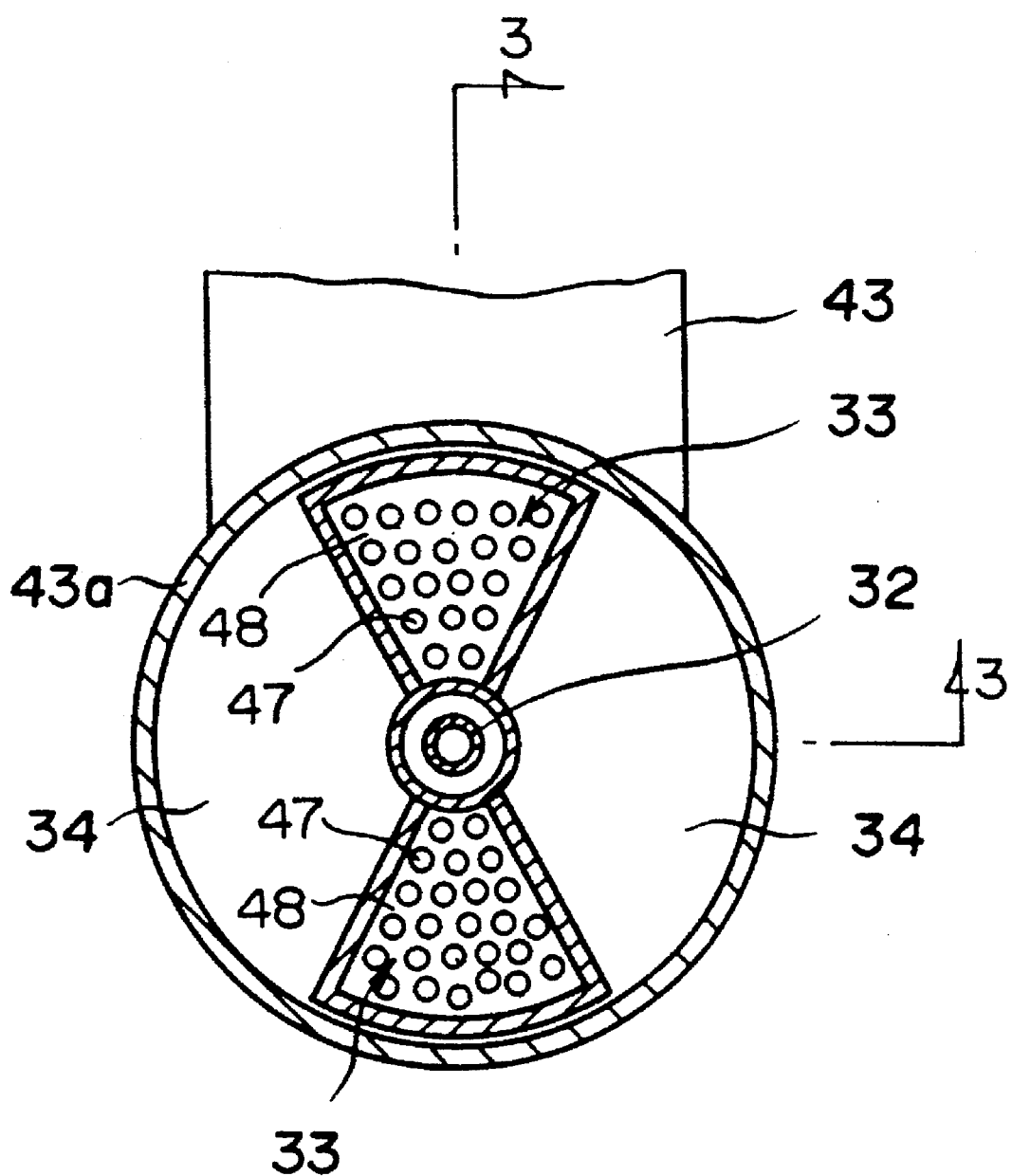
FIG. 2 is a cross section taken through FIG. 1 along the line 2—2.

In a body 43a of the outlet part 43, a large diameter part 44a of the rotary duct 44 is set in place. This large diameter part 44a is part of the oxidizing agent path 33 and has a cross section of an acute sector shape as illustrated in FIG. 2. Inside the body 43a, the oxidizing agent supply path 33 and the exhaust gas path 34 are positioned so as to alternate in the circumferential direction. The large diameter part 44a having an acute sector shape constitutes itself the oxidizing agent supply path 33 and the part so formed as to have a cross section of an acute sector shape serves as the exhaust gas path 34.

Here, the main body case 39 has the interior thereof divided by the plurality of oxidizing agent supply paths 33 disposed therein and the intervals between the adjacent oxidizing agent supply paths 33 constitute the exhaust gas paths 34 mentioned above. These oxidizing agent supply paths 33 may be disposed as circumferentially spaced round the burner 32 piercing the interior of the main body case 39 so that the oxidizing agent supply paths 33 and the exhaust gas paths 34 alternate. In this case, the oxidizing agent supply paths 33 and the exhaust gas paths 34 are desired to be disposed inside the main body case 39 in such a manner that they form one equal angle relative to the axis of the regenerating member 37. This arrangement is at an advantage in balancing between the area of the regenerating member 37 to be cooled by the oxidizing agent and the area thereof to be heated by the exhaust gas.

These oxidizing agent supply path 33 and exhaust gas path 34 are shaped so as to form two separate passages throughout the entire length from the inlet to the outlet. To be specific, the oxidizing agent supply path 33 is so adapted that the oxidizing agent flowing in through the oxidizing agent inlet part 42 is passed through the rotary duct 44 gradually flaring from a small diameter part 44b to the large diameter part 44a and is discharged in the direction of the regenerative member 37. Especially the oxidizing agent supply path 33 in the present embodiment has the outlet part, namely the regenerative member 37 side leading terminal thereof, closed with an end plate 48 having numerous small holes 47 so that the oxidizing agent on being discharged through the small holes 47 converts to high speed flow and, by virtue of the ensuant Venturi effect, draws into the oxidizing agent supply path 33 the exhaust gas liable to leak between the regenerative member 37 and the rotary duct 44 and restrains the amount of exhaust gas suffered to leak.

The exhaust gas path 34 is so adapted that the exhaust gas discharged from the regenerative member 37 is passed through the part having a cross section of an acute sector shape and led to an inner empty space 43b of the body 43a in the outlet part 43.

Here, a plurality of oxidizing agent supply paths 33 may be used instead of just one supply path 33 or a plurality of outlet parts ramifying from one supply path may be used. The outlet parts are desirably adapted so as to discharge the oxidizing agent while rotating about the axis of the regenerating member. This is not the only allowable arrangement of the outlet parts. The outlet parts may be adapted to be displaced vertically or laterally so that the area used for passage of the oxidizing agent in the regenerating member 37 changes along the course of time.

The driving means 45 rotatably supports the rotary duct 44 with seal members S and bearings J disposed respectively in the inner terminal part of a closing plate 49 set in place so as to close the counter-regenerative member side terminal part of the body 43a in the outer part 43 and the inner terminal part of a supporting plate 50 set in place in the right terminal part of the small diameter part 44b in the rotary duct 44 and connects through a chain 53 a sprocket 51 fixed between the two bearings J and J and a drive gear 52 rotated by a motor M.

In this embodiment, since the rotary duct 44 is supported in an ideally balanced state with the two bearings J and J as described above, it can be rotated at a relatively high speed and the thermal efficiency of the furnace can be improved by increasing the rotational speed.

Figure 5:
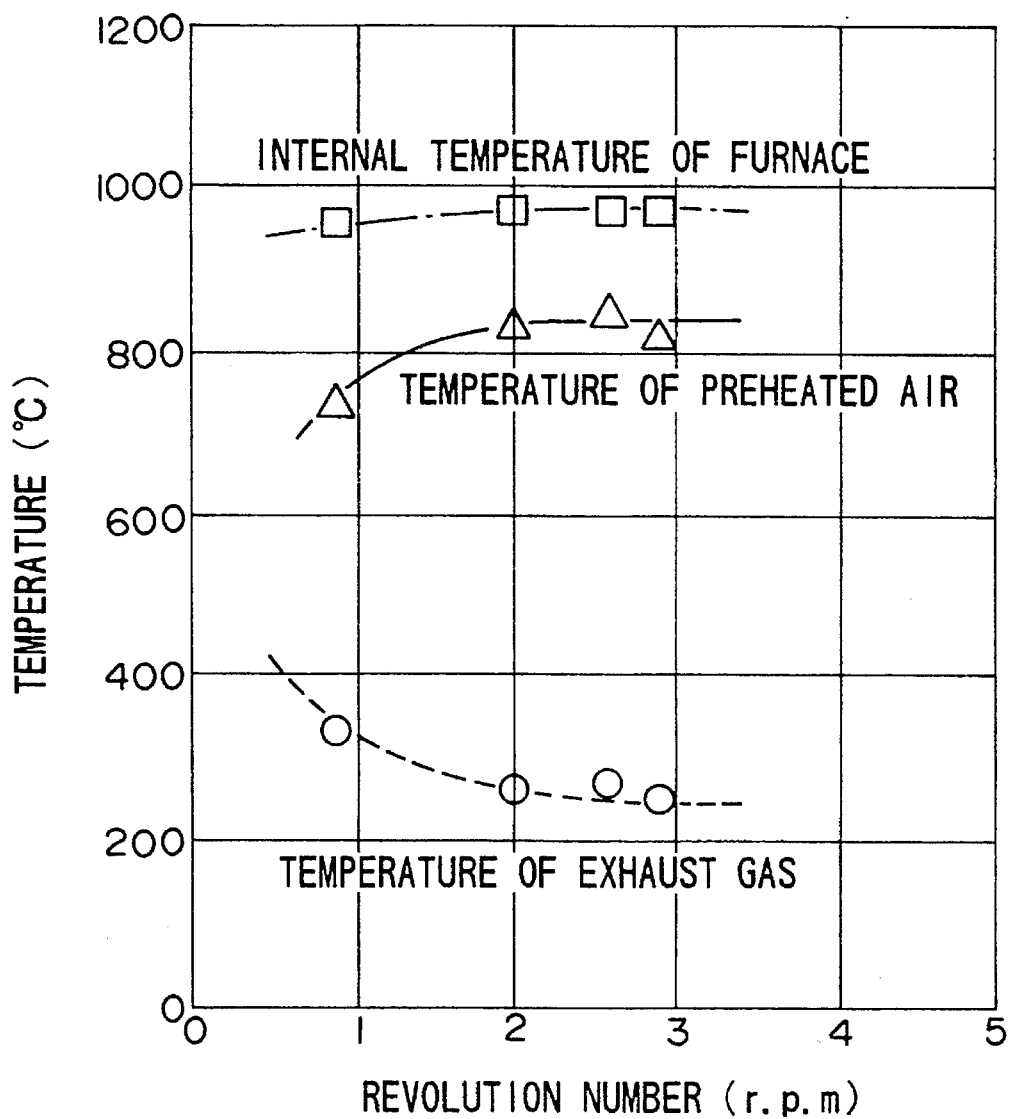
FIG. 5 is a graph showing the test results obtained of this invention.

An experiment was performed to determine the relation between the rotational speed of the rotary duct 44 and the thermal efficiency of the furnace. The results are shown in FIG. 5.

This experiment was performed by operating the apparatus of this embodiment using LPG as a fuel to determine the temperature of the exhaust gas, the temperature of the preheated oxidizing agent, and the internal temperature of the furnace relative to the rotational speed of the rotary duct 44. In FIG. 5, the horizontal axis is the scale of notational speed of the rotary duct 44 and the vertical axis is the scale of temperature.

It is clearly noted from the results of this experiment that the temperature of the exhaust gas sharply increases when the rotational speed of the rotary duct 44 falls below 1 r.p.m. and the rate of the temperature fall of the exhaust gas decreases when the rotational speed rises beyond 1 r.p.m.

Here, the thermal efficiency can be found from the relation between the amount of heat introduced and the amount of heat lost from the exhaust gas as indicated by the following formula.

$$\eta = (Q - Cp.G.T)0.100/Q$$

wherein
η: stands for thermal efficiency
Q: for thermal capacity
Cp: for specific heat of the exhaust gas
G: for the amount of the exhaust gas
T: for the temperature of the exhaust gas The thermal efficiency is found by applying the results of the aforementioned experiment to this formula. Take a case in which the rotation is made at a relatively high rate of 2 r.p.m., for example, the temperature of the exhaust gas which corresponds thereto is 250° C. The thermal efficiency in this case, therefore, is found as follows.

$$\eta = (25000 - 0.32 \times 26 \times 250) \times 100/25000 = 91.68 \ (\%)$$

This indicates that the combustion furnace manifests an outstanding thermal efficiency exceeding 90%.

The excellent thermal efficiency manifested during the rotation at such a relatively high speed is logically explained by a postulate that when the rotational speed of the rotary duct 44 is increased, the oxidizing agent discharged from the rotary duct 44 heavily lowers the temperature of the regenerative member and heightens more the temperature of the introduced oxidizing agent and, as a result, the thermal efficiency is enhanced.

The air inlet part 42 is formed by joining a basal pipe 54 to a branch pipe 55 after the pattern of the letter of inverted T. One terminal of this basal pipe 54 is closed with a lid member 56 and the other terminal thereof is attached to the supporting plate 50 of the small diameter part 44b so as to create communication with the rotary duct 44. The reference numeral "57" used in FIG. 1 stands for a flow regulating plate.

A fuel pipe 58 for supplying fuel to the burner 32 is laid along the central axis of the rotary duct 44. In the fuel pipe 58, an air pipe 59 (shown in FIG. 3) for supplying motive air (driving air) to the burner 32 is set in place. The size or sharpness of the flame radiated from the burner 32 is adjusted by controlling the amount of the motive air released from this air pipe 59. In the light of the relation between the sharpness of the flame produced with the theoretical amount of air and the loss of heat, the proper amount of the motive air is found to be approximately in the range between 2 and 5% of the theoretical amount of air as illustrated in FIG. 4. By adjusting the motive air, the flexibility, controllability, or versatility of the flame can be widened. The vapor may be used in place of the motive air.

Figure 3:
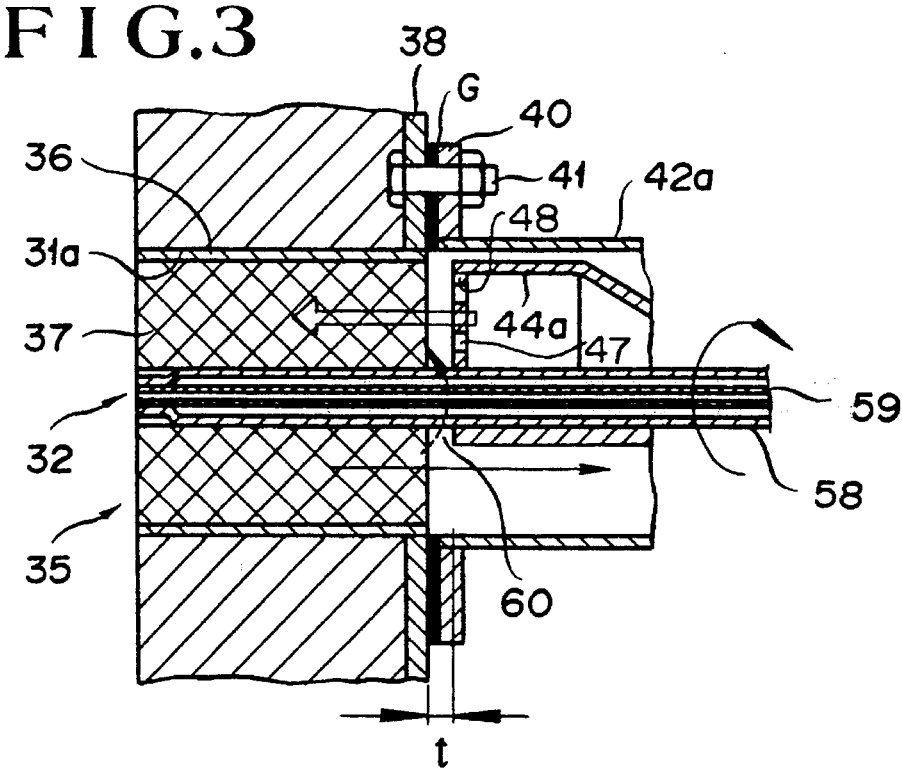
FIG. 3 is a detailed diagram illustrating the essential part of the apparatus of FIG. 1.
Figure 4:
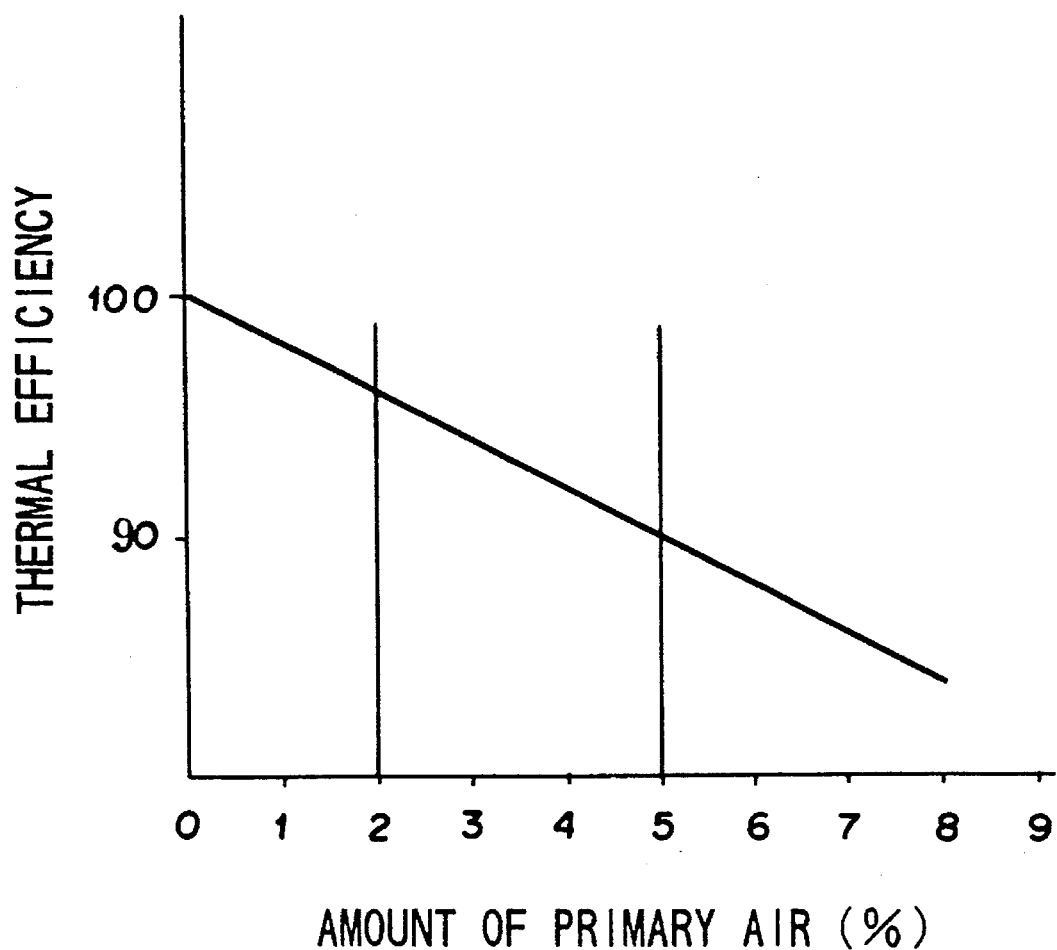
FIG. 4 is a diagram illustrating the control characteristic of the amount of motive air.

The oxidizing agent path 33, as illustrated in FIG. 3, is not extended to the terminal face of the regenerative member 37 made of a ceramic material but is formed so as to allow interposition of a gap t between itself and the ceramic regenerative member 37. This gap t may be utilized as a communicating part 60 for allowing part of the exhaust gas to bypass as indicated by the arrow of a broken line in the diagram. As a result, the amount of $NO_x$ in the exhaust gas can be adjusted because part of the exhaust gas is drawn into the oxidizing agent path 33 by suction and again consumed for combustion. The utilization of part of the exhaust gas for this consumption is facilitated by causing the oxidizing agent to be discharged at a high speed by the use of the numerous small holes 47 formed in the end plate 48 of the rotary duct 44.

Now, the operation of the present embodiment will be described below.

The generative heat recovery apparatus 30 is attached to a forging furnace, the burner 32 is ignited while the motor M is kept in rotation, and a blower is operated to feed the oxidizing agent.

The stream of fuel passed through the fuel pipe 58 and spouted from the burner 32 is replenished with oxygen from the oxidizing agent introduced through the oxidizing agent supply path 33 and the regenerative member 37. The flame produced by the combustion using the oxygen-enriched fuel it stretched in the direction of the substance subjected to combustion such as, for example, ingot. As a result, the internal temperature of the forging furnace is gradually elevated and, after the elapse of a prescribed time, the ingot in the forging furnace are heated and softened.

In this case, the exhaust gas is passed through the regenerative member 37 and discharged out of the exhaust gas path 34. The regenerative member 37 is heated to a high temperature owing to the passage therethrough of the exhaust gas. When the oxidizing agent discharged through the oxidizing agent supply path 33 kept in rotation is introduced into the regenerative member 37, therefore, this oxidizing agent is heated by the regenerative member 37.

The regenerating part 35 of a high temperature is rendered usable for heating the oxidizing agent by changing the area for passage of the oxidizing agent in the regenerating part 35 as described above. This heating may well be called instantaneous in the sense that the oxidizing agent is heated immediately by blowing the oxidizing agent out of the oxidizing agent supply path 33 in the direction of the regenerative member 37. Thus, the recovery of heat is accomplished without entailing any loss of heat during the process of heating, with the result that the oxidizing agent heated to a high temperature can be efficiently produced. In the meantime, the operation of combustion by the use of this hot oxidizing agent proceeds in a region of very high temperature. Thus, the interval between the time the combustion is started and the time the prescribed temperature is reached becomes short. The exhaust gas after transferring the heat thereof to the regenerative member 37 is passed along the outer periphery of the oxidizing agent supply path 33 which is passing the oxidizing agent of relatively low temperature and is then discharged from the exhaust gas path 34. The combustion apparatus of this embodiment, therefore, does not always find use for a stack directly connected to a forging furnace.

When part of the exhaust gas flows through the communicating part 60 between the rotary duct 44 and the ceramic regenerative member 37 during the process of combustion, the amount of $NO_x$ suffered to be contained in the exhaust gas can be restrained below a prescribed level because part of the exhaust gas is admixed with the oxidizing agent on the oxidizing agent supply path 33 side and consequently consumed again in combustion. The provision of this communicating part 60 further has the advantage in that the overall configuration of the apparatus is simplified and the efficiency of apparatus assemblage is enhanced because this communicating part 60 obviates the necessity for sealing the gap between the oxidizing agent supply path 33 and the exhaust gas path 34.

Figure 6:
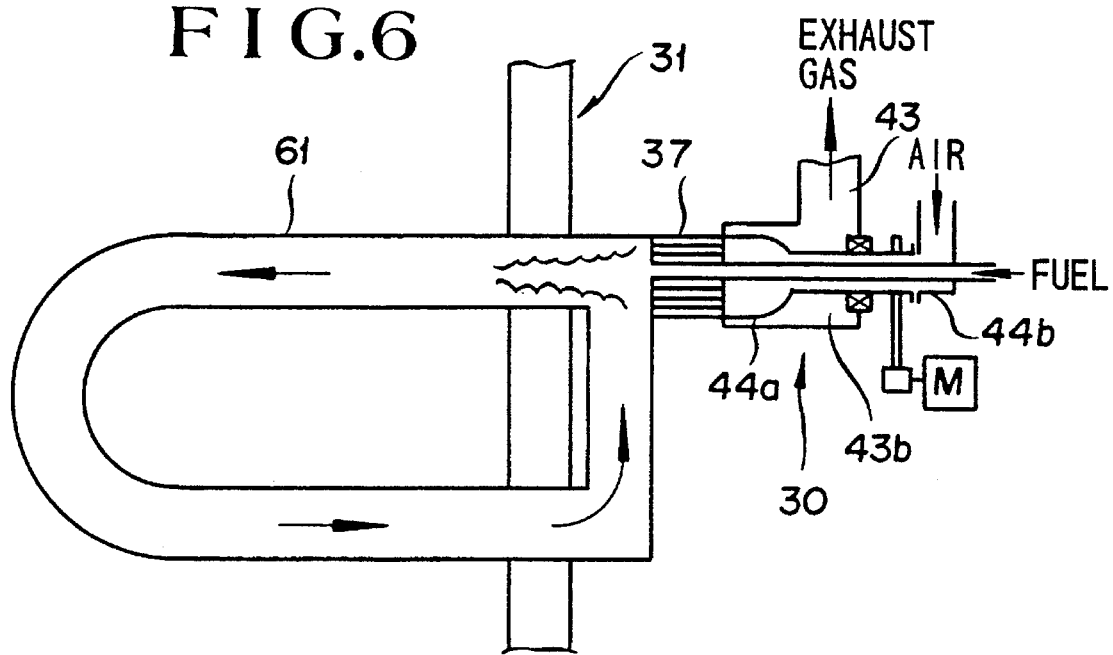
FIG. 6 is a schematic cross section illustrating another embodiment of this invention.

FIG. 6 illustrates an apparatus as another embodiment of this invention. In this embodiment, the apparatus 30 is connected to a radiant tube 61. The exhaust gas is not discharged into the interior of the furnace but allowed to flow inside the radiant tube 61 and, after the substance subjected to heating has been heated solely by the heat of the ambient air, discharged out of the exhaust gas path 43. This apparatus 30, therefore, proves ecologically clean, notwithstanding it is identical from the structural point of view with that of the preceding embodiment.

Figure 7:
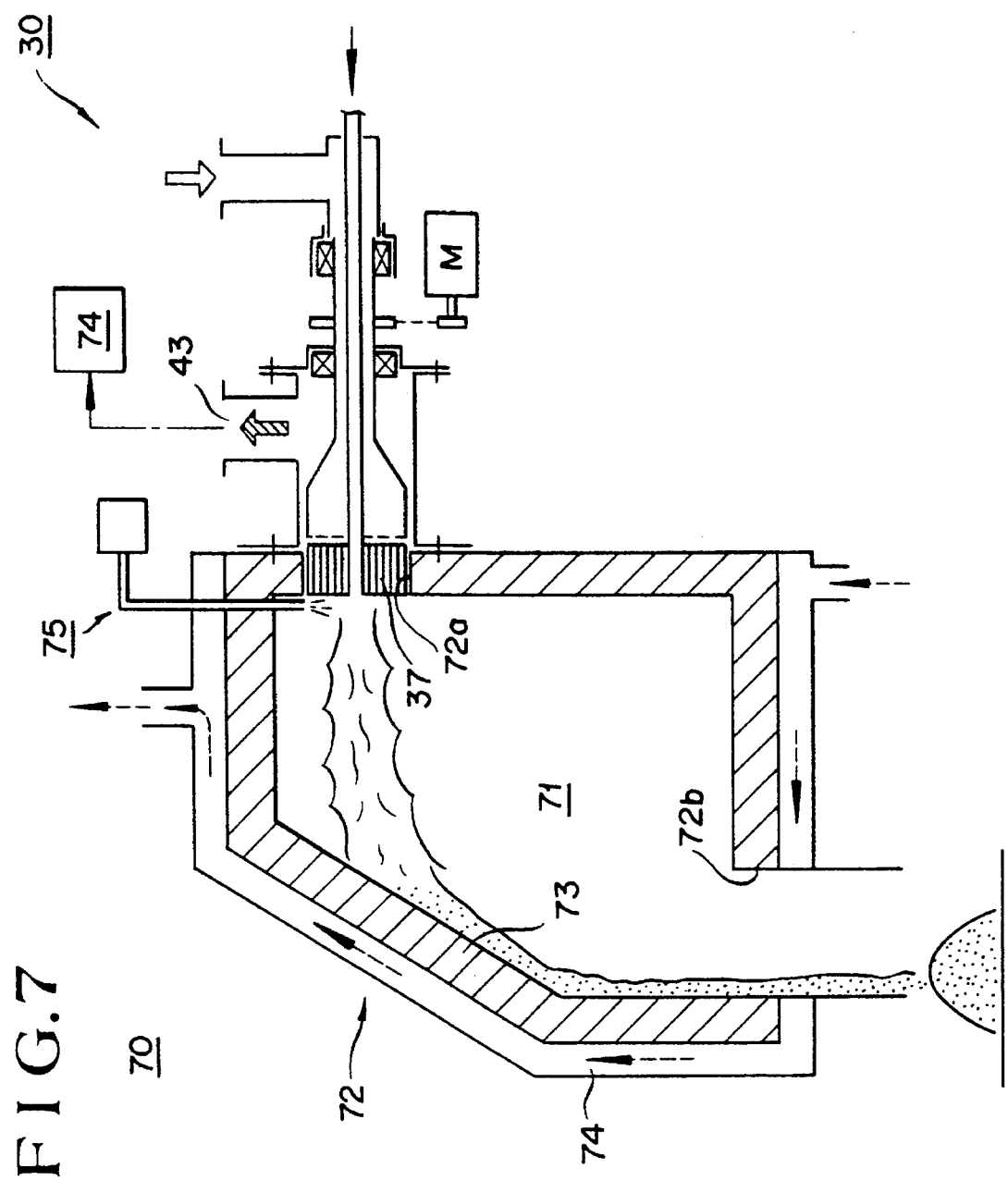
FIG. 7 is a schematic cross section illustrating yet another embodiment of this invention.

FIG. 7 illustrates an apparatus as still another embodiment of this invention. This apparatus is intended for use in an ash-dissolving furnace which operates by the combustion of flame retardant coarse fuel, such as CWM (Coal Water Mixture) etc., productive of ash on combustion (hereinafter referred to simply as "flame retardant fuel") and smoothly discharges dissolved ash out of the furnace proper.

Generally when such a flame retardant fuel as CWM or fine coal dust which produces ash on combustion is burnt, the ash content of the fuel is melted or partly melted in the flame of high temperature and deposited on the inner wall of the furnace possibly to entail the trouble of clogging. To avoid this trouble, the practice of keeping the inner temperature of the furnace above the melting point of the ash thereby positively melting the ash and causing the ash to be discharged in the form of molten slug out of the furnace has been in vogue.

When the melting point of ash happens to be so high as to reach the neighborhood of 1,450° C., for example, the ratio of elimination of the ash is unduly low because thorough melting and depositing of the ash is not obtained with the ordinary oxidizing agent.

For the solution of this problem, a) a method which lowers the melting point of the ash by incorporating a melting point-lowering agent such as, for example, lime in the ash, b) a method which elevates the combustion temperature by preheating the oxidizing agent by the use of a heat exchanger, c) a method which elevates the combustion temperature by the use of an oxygen-enriching agent, and the like are available.

The method of a) is undesirable because it not merely adds to the cost of combustion but also increases the amount of ash to be produced, the method of b) cannot be expected to effect sufficient elevation of temperature because of the limit imposed on the heat exchanger itself, and the method of c) suffers from unduly large increase in the cost of combustion because of the limit imposed on the supply of oxygen itself.

When the apparatus described above is used, the elevation of the combustion temperature and the smooth discharge of the dissolved ash from the furnace are attained without requiring use of an oxygen-enriching agent.

A slag tap type ash-dissolving furnace 70 illustrated in FIG. 7 is provided with a furnace body 72 having a combustion chamber 71 formed therein and the apparatus 30 to be operated by the combustion of such flame retardant fuel as CWM (coal-water mixture).

The furnace body 72 is formed of a water-cooled furnace wall provided with a water pipe 74 and disposed outside a furnace wall 73 made of a castable refractory material and the like. The furnace body 72 has an opening 72a formed at the top part of the lateral wall thereof and a slag tap hole 72b formed in the bottom wall thereof.

The apparatus 30 is attached to the opening 72a. A heating device 74, for example, a boiler may be attached to the outlet of the exhaust gas path 43 of the apparatus 30 and enabled to utilize as the fuel therefor the exhaust gas discharged via the exhaust gas path 43. When air of an amount less than enough for complete combustion of the flame retardant fuel introduced into the furnace is used as the oxidizing agent, the fuel is partially burnt and suffered to discharge exhaust gas containing such flammable gases as CO and $H_2$ in large amounts and having only low calory. This low-calory gas can be utilized again as a fuel.

When the apparatus 30 is used in the ash dissolving furnace, at the time that the combustion gas generated inside the furnace is discharged through the regenerative member 37, the possibility arises that some of the molten ash will be entrained by the exhaust gas and consequently suffered to enter into the regenerative member 37, and deposited inside the regenerative member 37 to the extent of clogging it. It is, therefore, desirable to install cooling means 75 inside the furnace of the regenerative member 37 and cause the cooling means 75 to spout a low-temperature fluid, for example, the oxidizing agent to lower the temperature of the molten ash below the melting point of the ash.

In the ash dissolving furnace which utilizes the apparatus 30 as described above, the combustion air of very high temperature is produced efficiently because the regenerative member 37 is heated to a high temperature by the exhaust gas produced by the combustion of the flame retardant fuel and consequently enabled to heat the combustion air. Thus, the operation of combustion which is performed with the hot air proceeds in a region of very high temperature.

Owing to the combustion which proceeds in the region of high temperature, therefore, the ash content of the flame retardant fuel is allowed to contact the inner wall of the combustion chamber 71 and deposit fast on the furnace body 73 which is cooled with the water pipe 74. At this time, the ash alone is deposited fast in the molten state on the inner wall if the fuel has been completely consumed already. If fine coat dust is still in the process of combustion and a layer of fused coal has been formed on the inner wall of the combustion chamber 71, the deposited coal layer remains intact and the combustion is completed.

In this manner, the inner wall of the combustion chamber 71 is covered with the fused coal layer and the fused coal layer gradually gains in thickness and gravitationally gathers at the bottom part of the furnace body and falls down the furnace through the slag tap holes 72b. Particularly when the ash is dissolved, the inner wall of the furnace is coated with the solidified crust of molten ash and, as a result, the furnace itself is prevented from loss by fusion.

When the air of an amount less than enough for complete combustion of the fuel introduced into the furnace is used as the oxidizing agent, the fuel is partially burnt and the exhaust gas discharged through the exhaust gas path 43 has virtually no ash content in spite of fairly high temperature and contains such flammable gases as CO and $H_2$ in large amounts and possesses low calory. When this exhaust gas is supplied to a heating device such as a boiler, it can be used as a gaseous fuel. Thus, even an ash-containing flame retardant fuel can be converted into an easily handlable gaseous fuel which can be utilized efficiently.

Figure 8:
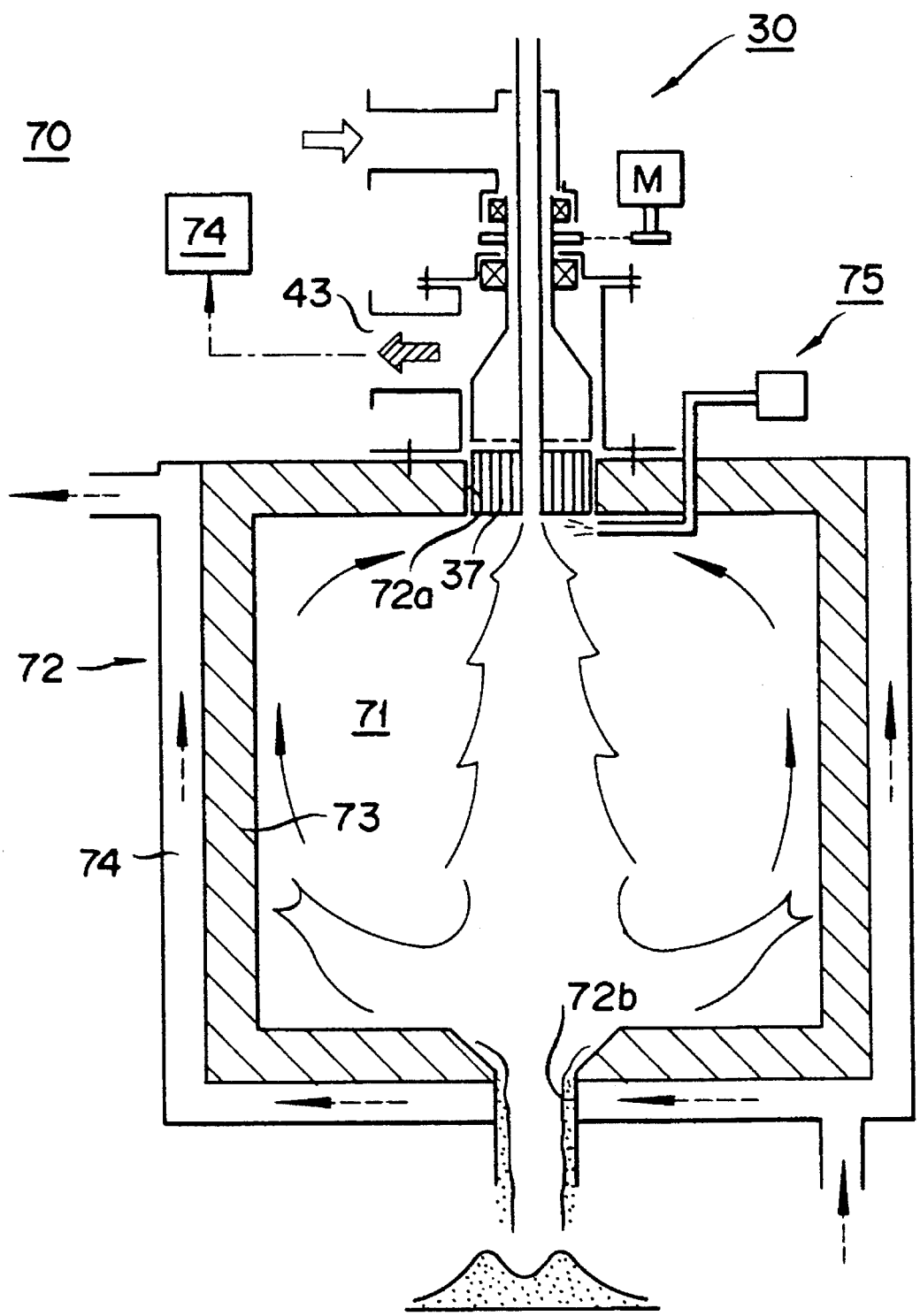
FIG. 8 is a schematic cross section illustrating a further embodiment of this invention.
Figure 9:
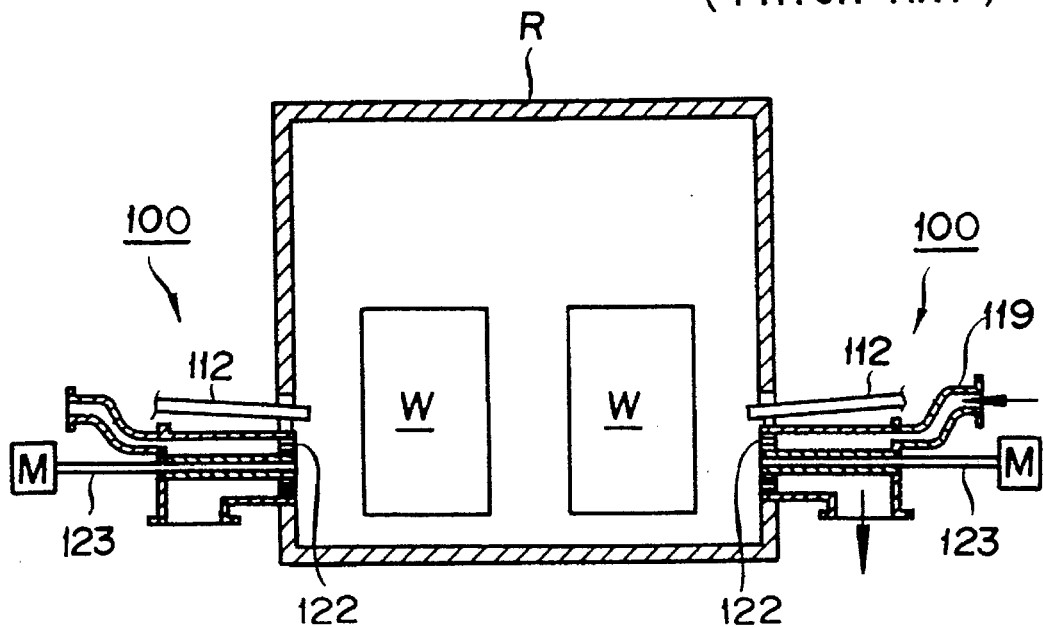
FIG. 9 is a schematic cross section illustrating a conventional combustion apparatus.
Figure 10:
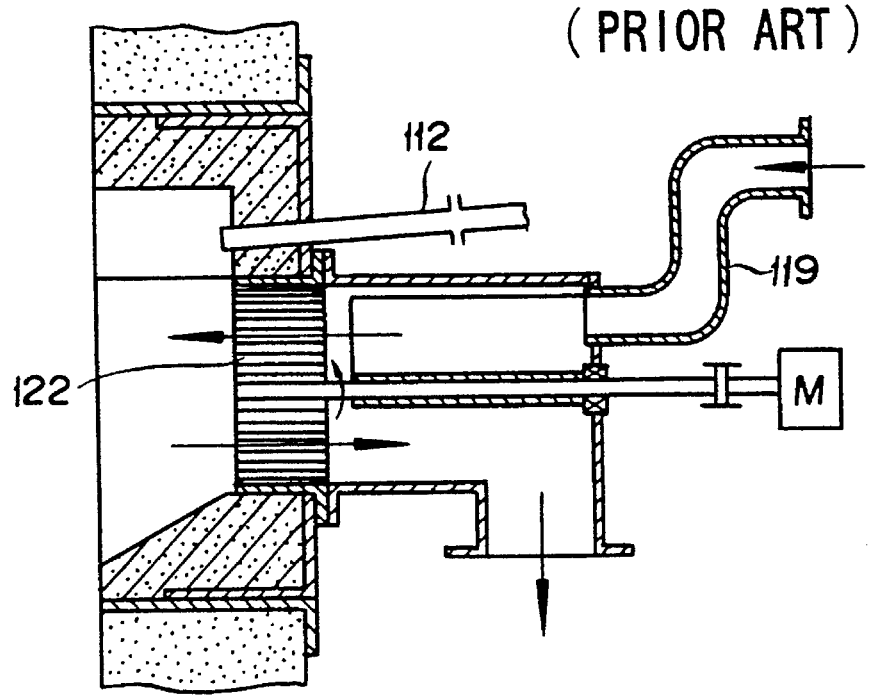
FIG. 10 is a magnified cross section of the essential part of the apparatus of FIG. 9.

The apparatus 30 described above may be configured in a vertical type as illustrated in FIG. 8 and attached to the top part of the furnace body 72, with a slag tap hole 72b formed at the center of the bottom wall of the furnace body 72.

This invention can be embodied not only in the apparatus for heat recovery as described above but also in such furnaces as the forging furnaces and the ash-dissolving furnaces and heating apparatuses such as drying apparatuses and steam-generating apparatuses represented by turbines. In short, this invention finds extensive utility in combustion apparatuses of the class designed to utilize the heat generated by combustion.

While the embodiments cited thus far represent cases in which oxidizing agent supply path 33 and exhaust gas path 34 are formed two each by partitioning the interior of a rotary duct 44, this invention allows formation of a multiplicity of oxidizing agent supply paths and exhaust gas paths. Though the rotary duct 44 has been depicted as being provided at the center thereof with an air duct for supplying motive air, the apparatus of this invention does not always find use for this air duct.

We claim:

1. An apparatus for regenerative heat recovery comprising a burner for heating a substance for combustion in the main body of a combustion apparatus, an oxidizing agent supply path for supplying an oxidizing agent to said burner, an exhaust gas discharge path for discharging the exhaust gas resulting from the combustion to the exterior of the main body of said combustion apparatus, and a regenerating part for heating said oxidizing agent with the sensible heat of said exhaust gas, which apparatus for heat recovery is characterized by having the regenerating part formed of an air-pervious regenerating member, said regenerating member being attached to an interior portion of a wall of the main body of said combustion apparatus, the downstream end of said oxidizing agent supply path being located at said regenerating member with a discharge path being formed at said downstream end of said oxidizing agent supply path to comprise means for leading the oxidizing agent discharged from said oxidizing agent supply path to said main body of said combustion apparatus and through part of said regenerating member, and means for simultaneously driving one of said regenerating member and said oxidizing agent supply path to displace said regenerating member with respect to said oxidizing agent supply path and to change the area of the portion of said regenerating member through which said oxidizing agent passes during the period of time in which, said driving takes place and in which said oxidizing agent is flowing in said supply path.

2. An apparatus according to claim 1, wherein said oxidizing agent and said exhaust gas simultaneously flow in different directions along independent separate paths of flow with the flow of said gas being in a one-way non-reversible direction.

3. An apparatus according to claim 2, wherein said oxidizing agent supply path is adapted to spout said oxidizing agent through one and over of outlet parts in the direction of said regenerating member.

4. An apparatus according to claim 2, wherein said oxidizing agent supply path is so adapted that said outlet parts turn about the axis of said regenerating member while spouting said oxidizing agent in the direction of said regenerating member.

5. An apparatus according to claim 2, wherein said oxidizing agent supply path is formed inside a main body case communicating with said regenerating member and separated from said exhaust gas path throughout the entire length from the inlet to the outlet.

6. An apparatus according to claim 5, wherein said main body case is divided by a plurality of said oxidizing agent supply paths disposed therein and the intervals between the adjacent oxidizing agent supply paths constitute themselves said exhaust gas paths.

7. An apparatus according to claim 6, wherein said oxidizing agent supply paths are disposed as regularly spaced circumferentially round said burner piercing the interior of said main body case to establish alternation between said oxidizing agent supply paths and said exhaust gas paths.

8. An apparatus according to claim 7, wherein said oxidizing agent supply paths and said exhaust gas paths are disposed inside said main body case so that they form equal angles relative to the axis of said regenerating member respectively.

9. An apparatus according to claim 2, wherein said oxidizing agent supply paths have said outlet parts thereof blocked with an end plate provided with a multiplicity of small through holes.

10. An apparatus according to claim 2, wherein a prescribed gap is interposed between said outlet parts of said oxidizing agent supply path and said regenerating part to form a communicating part for inducing part of said exhaust gas into said oxidizing agent supply path.

11. An apparatus according to claim 2, wherein said burner is furnished with an air pipe for supplying motive air.

12. An apparatus according to claim 2, wherein said regenerating member is made of a ceramic substance.

13. An apparatus for combustion comprising a burner for heating a substance for combustion in the main body of a combustion apparatus, an oxidizing agent supply path for supplying an oxidizing agent to said burner, an exhaust gas discharge path for discharging the exhaust gas resulting from the combustion to the exterior of the main body of said combustion apparatus, and a regenerating part for heating said oxidizing agent with the sensible heat of said exhaust gas, which apparatus for combustion is characterized by having the regenerating part formed of an air-pervious regenerating member, said regenerating member being attached to an interior portion of a wall of the main body of said combustion apparatus, the downstream end of said oxidizing agent supply path being located at said regenerating member with a discharge path being formed at said downstream end of said oxidizing agent supply path to comprise means for leading the oxidizing agent discharged from said oxidizing agent supply path to said main body of said combustion apparatus and through part of said regenerating member, and means for simultaneously driving one of said regenerating member and said oxidizing agent supply path to displace said regenerating member with respect to said oxidizing agent supply path and to change the area of the portion of said regenerating member through which said oxidizing agent passes during the period of time in which said driving takes place and in which said oxidizing agent is flowing in said supply path.

14. An apparatus according to claim 13, wherein said oxidizing agent and said exhaust gas simultaneously flow in different directions along independent separate paths of flow with the flow of said gas being in a one-way non-reversible direction.

15. An apparatus according to claim 14, wherein said oxidizing agent supply path is adapted to spout said oxidizing agent through one and over of outlet parts in the direction of said regenerating member.

16. An apparatus according to claim 14, wherein said oxidizing agent supply path is so adapted that said outlet parts turn about the axis of said regenerating member while spouting said oxidizing agent in the direction of said regenerating member.

17. An apparatus according to claim 14, wherein said oxidizing agent supply path is formed inside a main body case communicating with said regenerating member and separated from said exhaust gas path throughout the entire length from the inlet to the outlet.

18. An apparatus according to claim 17, wherein said main body case is divided by a plurality of said oxidizing agent supply paths disposed therein and the intervals between the adjacent oxidizing agent supply paths constitute themselves said exhaust gas paths.

19. An apparatus according to claim 18, wherein said oxidizing agent supply paths are disposed as regularly spaced circumferentially round said burner piercing the interior of said main body case to establish alternation between said oxidizing agent supply paths and said exhaust gas paths.

20. An apparatus according to claim 19, wherein said oxidizing agent supply paths and said exhaust gas paths are disposed inside said main body case so that the they form equal angles relative to the axis of said regenerating member, respectively.

21. An apparatus according to claim 14, wherein said oxidizing agent supply paths have said outlet parts thereof blocked with an end plate provided with a multiplicity of small through holes.

22. An apparatus according to claim 14, wherein a prescribed gap is interposed between said outlet parts of said oxidizing agent supply path and said regenerating part to form a communicating part for inducing part of said exhaust gas into said oxidizing agent supply path.

23. An apparatus according to claim 14, wherein said burner is furnished with an air pipe for supplying motive air.

24. An ash-dissolving furnace having attached to the body of said furnace an apparatus for combustion comprising a burner for heating a substance for heating in the body of said furnace, an oxidizing agent supply path for supplying an oxidizing agent to said burner, an exhaust gas discharge path for discharging an exhaust gas resulting from the combustion to the exterior of the body of the furnace, and a regenerating part for heating said oxidizing agent with the sensible heat of said exhaust gas, which ash-melting furnace is characterized by having said regenerating part formed of a gas-pervious regenerating member, the regenerating member being attached to an interior portion of a wall of the main body of said combustion apparatus, the downstream end of said oxidizing agent supply path being located at said regenerating member with a discharge path being formed at said downstream end of said oxidizing agent supply path to comprise means for leading the oxidizing agent discharged from said oxidizing agent supply path to said main body of said combustion apparatus and through part of said regenerating member, and means for simultaneously driving one of said regenerating member and said oxidizing agent supply path to displace said regenerating member with respect to said oxidizing agent supply path and to change the area of the portion of said regenerating member through which said oxidizing agent passes during the period of time in which said driving takes place and in which said oxidizing agent is flowing in said supply path.

25. An apparatus according to claim 24, wherein said oxidizing agent and said exhaust gas simultaneously flow in different directions along independent separate paths of flow with the flow of said gas being in a one-way non-reversible direction.

26. An ash-dissolving furnace according to claim 25, wherein said combustion apparatus is provided with cooling means adapted to spout a stream of relatively low temperature in the form of a film to the furnace side end surface of said regenerating member.

27. An apparatus according to claim 25, wherein said oxidizing agent supply path is adapted to spout said oxidizing agent through one and over of outlet parts in the direction of said regenerating member.

28. An apparatus according to claim 25, wherein said oxidizing agent supply path is so adapted that said outlet parts turn about the axis of said regenerating member while spouting said oxidizing agent in the direction of said regenerating member.

29. An apparatus according to claim 25, wherein said oxidizing agent supply path is formed inside a main body case communicating with said regenerating member and separated from said exhaust gas path throughout the entire length from the inlet to the outlet.

30. An apparatus according to claim 29, wherein said main body case is divided by a plurality of said oxidizing agent supply paths disposed therein and the intervals between the adjacent oxidizing agent supply paths constitute themselves said exhaust gas paths.

31. An apparatus according to claim 30, wherein said oxidizing agent supply paths are disposed as regularly spaced circumferentially round said burner piercing the interior of said main body case to establish alternation between said oxidizing agent supply paths and said exhaust gas paths.

32. An apparatus according to claim 31, wherein said oxidizing agent supply paths and said exhaust gas paths are disposed inside said main body case so that the they form equal angles relative to the axis of said regenerating member.

33. An apparatus according to claim 25, wherein said oxidizing agent supply paths have said outlet parts thereof blocked with an end plate provided with a multiplicity of small through holes.

34. An apparatus according to claim 25, wherein a prescribed gap is interposed between said outlet parts of said oxidizing agent supply path and said regenerating part to form a communicating part for inducing part of said exhaust gas into said oxidizing agent supply path.

35. An apparatus according to claim 25, wherein said burner is furnished with an air pipe for supplying motive air.

36. An apparatus according to claim 25, wherein said regenerating member is made of a ceramic substance.

37. An ash-dissolving furnace having attached to the body of said furnace an apparatus for combustion comprising a burner for heating a substance for heating in the body of said furnace, an oxidizing agent supply path for supplying an oxidizing agent to said burner, an exhaust gas discharge path for discharging an exhaust gas resulting from the combustion to the exterior of the body of the furnace, and a regenerating part for heating said oxidizing agent with the sensible heat of said exhaust gas, which ash-melting furnace is characterized by having said regenerating part formed of a gas-pervious regenerating member, the regenerating member being attached to an interior portion of a wall of the main body of said combustion apparatus, the downstream end of said oxidizing agent supply path being located at said regenerating member with a discharge path being formed at said downstream end of said oxidizing agent Supply path to comprise means for leading the oxidizing agent discharged from said oxidizing agent SUPPLY path to said main body of said combustion apparatus and through part of said regenerating member, and means for simultaneously driving one of said regenerating member and said oxidizing agent supply path to displace said regenerating member with respect to said oxidizing agent Supply path and to change the area of the portion of said regenerating member through which said oxidizing agent passes during the period of time in which said driving takes place and in which said oxidizing agent is flowing in said supply path.

* * * * *